United States Patent Office 3,543,437
Patented Dec. 1, 1970

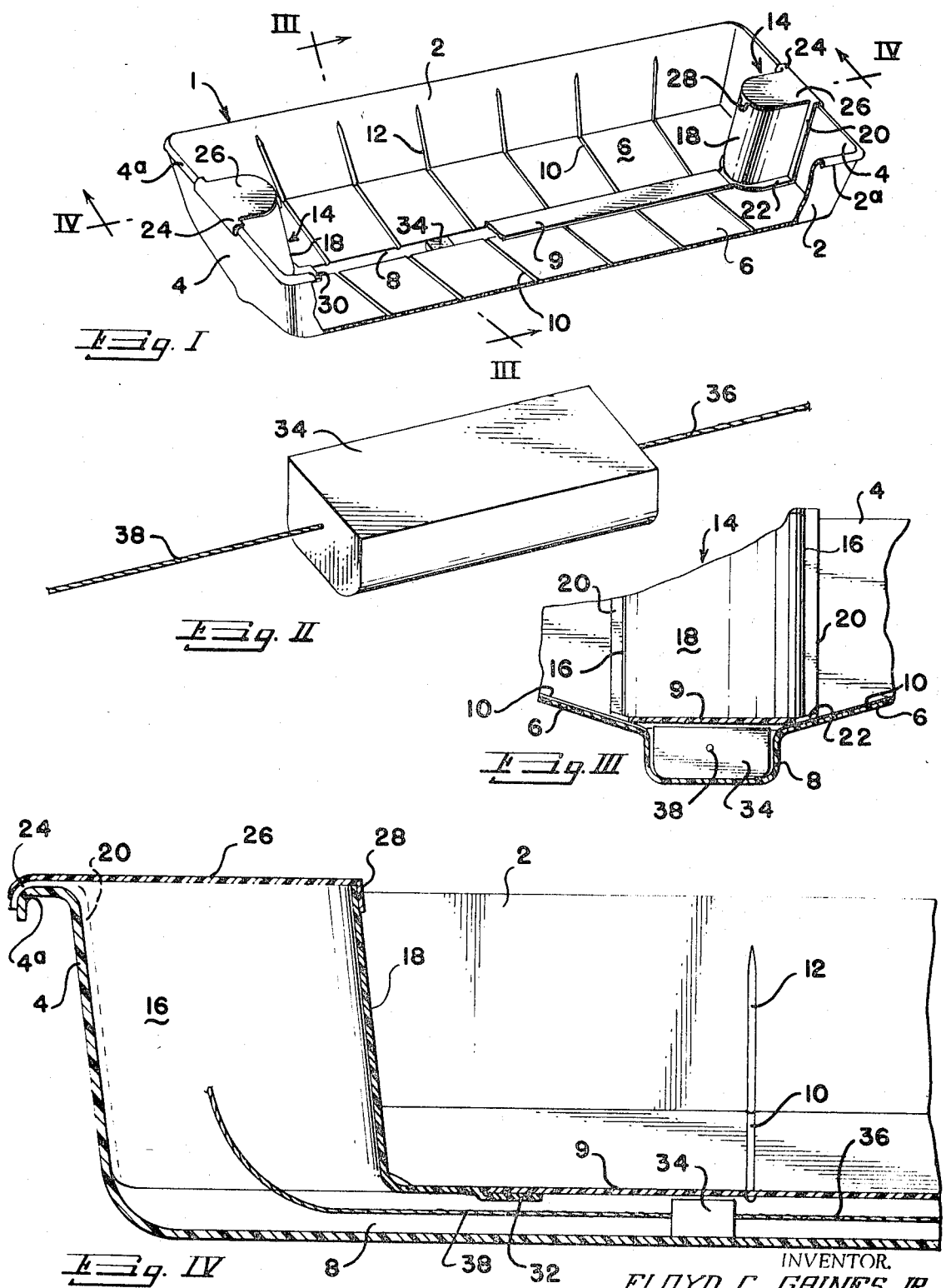

3,543,437
DEVICE FOR REMOVING ROOTS AND OTHER
MATERIAL FROM HYDROPONIC BEDS
Floyd C. Gaines, Jr., Grapevine, Tex., assignor to Pan American Hydroponics, Inc., Grapevine, Tex., a corporation of Texas
Filed May 31, 1968, Ser. No. 733,401
Int. Cl. A01g 9/02; B08b 9/02
U.S. Cl. 47—34           7 Claims

ABSTRACT OF THE DISCLOSURE

A device for cleaning roots from channels in troughs for hydroponic plant beds through which water and other nutrients are delivered to plant roots.

BACKGROUND OF THE INVENTION

There are many variations of the basic technique of growing plants without soil and the names of each are somewhat descriptive of the methods used. Some of the better known are as follows: Water culture, sand culture, sub-irrigation culture, gravel culture, cinder culture and trough culture. All of these techniques are loosely known as "hydroponics." The technique of growing vegetables hydroponically which has proven to be the most practical is properly known as sub-irrigation culture or gravel culture. Using this method, trays or troughs of inert material, such as fiberglass, are filled with gravel and plants are placed in this medium with the roots being flooded from below at intervals with a water solution containing salts and all the elements known to be essential to the proper plant growth. It is necessary that all of these salts be placed in the solution in the proper proportions and that the total concentration of the salts be carefully controlled as well as the pH and temperature of this solution.

Minimum frequency of irrigation depends upon the surfaces of the aggregate, the size of the crop, and climatic factors. Smooth, regularly shaped, coarse aggregates must be irrigated more frequently than porous, irregularly shaped, fine aggregates having large surface areas. Large plants require more frequent irrigation than small plants. Hot, dry weather promotes rapid evaporation and makes it necessary to irrigate more often than would otherwise be necessary. The aggregate must be irrigated at least once a day, and three irrigations per day frequently are required.

The irrigation channel through which the water and nutrients are supplied to irrigate the gravel is supplied through a channel in the bottom of the hydroponic bed. Roots of plants planted in a hydroponic bed grow downward and tend to seek out and concentrate in areas of the most abundant supply of plant food, consequently the roots will grow into and completely fill the channel through which liquid is used to irrigate the gravel unless the roots are cleaned out from time to time.

Heretofore no adequate means has been available for cleaning out the channel which did not require emptying the gravel from the hydroponic bed. This method is impractical and requires numerous hours of labor. Likewise the channel could not be cleaned after plants had been set out of the hydroponic bed.

SUMMARY OF THE INVENTION

The present invention consists of a clean-out block which may be drawn through the channel in the bottom of a trough for hydroponic plant beds shearing roots which have grown into and accumulated in the channel.

A primary object of the present invention is to provide a clean-out device which may be utilized for cleaning out the channel through which the water and nutrients are supplied to irrigate the hydroponic bed without removing the aggregate from the bed.

A further object of the present invention is to provide a clean-out device which may be utilized to clean out the channel through which water and other nutrients are supplied without disturbing the basic root structure of plants which are being grown in the hydroponic bed thereby eliminating the possibility of roots filling the channel and stopping the flow of water and other nutrients to the plants prior to maturity of the plants.

A further object of the present invention is to provide a durable clean-out device the use of which is economically feasible in the hydroponic production of crops.

Another object of the present invention is to provide a clean-out device which is simple to operate thereby eliminating extensive training for the operator.

Other and further objects of the present invention will become apparent upon examination of the specification, drawings and claims hereinafter following.

DESCRIPTION OF THE DRAWINGS

The accompanying drawings of the present invention are provided so that the invention may be better and more fully understood, in which:

FIG. I is a perspective views of a trough for hydroponic plant beds with parts broken away to show the relationship of the clean-out device with relation thereto, FIG. II is a perspective view of the clean-out device, FIG. III is a section taken substantially along lines III—III of FIG. I, FIG. IV is a cross-sectional view taken substantially along lines IV—IV of FIG. I.

Numeral references are employed to indicate the variout parts shown in the drawings and like numerals indicate like parts throughout the various figures of the drawing.

DESCRIPTION OF THE PREFERRED EMBODIMENT

Referring to FIG. I of the drawing numeral 1 generally designates a trough for use as a container for hydroponic plant beds. Trough 1, which may be constructed of any suitable inert material such as fiberglass, is a structure formed by upwardly extending side walls 2 joined by end sections 4 and upwardly sloping bottom sections 6. The channel 8 is formed in the lowermost part of trough 1 at the intersection of the bottom sections 6 providing a means for transporting fluid throughout the length of the trough 1. Lateral grooves 10, which communicate with channel 8, are formed in the bottom sections 6 and connect with grooves 12 in the side wall sections 2. Fluid may pass through channel 8 into lateral grooves 10 and 12 for delivery to gravel or other material which is placed in the trough 1 for a hydroponic plant bed.

Channel 8 is bridged by a cover plate 9 to prevent obstruction of channel by gravel or other material placed in trough 1. The cover plate 9 is removable and is shorter in length than channel 8. Hollow retainers 14 are positioned at opposite ends of cover plate 9 and keep out gravel so as to provide a means for gaining access to the ends of channel 8 at all times.

Each retainer 14 consists of upstanding sides 16 closed at one end by an arcuate surface 18 defining a U-shaped structure. The sides 16 of each retainer 14 lie in spaced apart relation with upturned stiffeners formed on the edges opposite the arcuate surface 18. Stiffener 20 is connected at one end with a stiffener 22 which extends along the bottom edge of the sides 16 and arcuate surface 18. Stiffener 20 has a rolled portion at the upper end thereof forming hangers 24 which conform to the curvature of the rolled edge 4a of end wall 4 of the trough 1. A lid 26 is pivotally attached to the upper portion of retainer 14 and forms a closure with the sides 16 and 18 of retainer 14. A latch 28 is provided for maintaining the lid 26 in a closed position.

Stiffener 22 has a protruding section 30 extending therefrom which has a downwardly extending guide 32 which fits into channel 8 for maintaining alignment between retainer 14 and channel 8.

A clean-out block 34, shaped to conform with a cross section of the area formed by channel 8 and cover plate 9, has draw cords 36 and 38 attached to the opposite ends thereof. Each draw cord 36 and 38 is of a length greater than that of the channel 8 on the bottom of trough 1 with the cords 36 and 38 extending in opposite directions in the channel 8.

OPERATION

When plants have been set out in the hydroponic beds of porous material in trough 1, the roots grow into the channel 8 through the space between the bottom sections 6 and the cover plate 9. To clean the roots from the channel 8, lid 26 of retainer 14 is raised providing access to one end of the draw cord 36 or 38. Clean-out block 34 may be drawn through the channel 8 by pulling on the respective draw cords thereby scraping the roots from the channel 8 and depositing them in the retainer.

After the clean-out block 34 has been drawn through the channel 8 cleaning the roots therefrom, the clean-out block is stored in one of the retainers 14 with a draw cord remaining in the channel extending to the other retainer 14 at the opposite end of the trough 1. When it is necessary to clean channel 8 again, the clean-out block 34 is merely drawn back through the channel 8.

It will be understood that other and further embodiments of my invention may be made without departing from the spirit and scope of the appended claims.

I claim:

1. In a hydroponic plant bed, a trough; a channel formed along the bottom wall of the trough, said channel extending from one end of the trough to the other end thereof; a plurality of laterally extending grooves formed in the bottom and side walls of the trough communicating with the channel; a cover for said channel; a hollow retainer attached to the trough and extending inwardly thereof at each end thereof; the said retainers communicating with the ends of the channel and having a wall extending upwardly of the bottom of the trough to keep granular plant supporting material out of the channel and to provide access to the clean-out member at each end of the channel; a clean-out member in and movable through the channel; and means attached to the clean-out member and said means being accessible in the retainers to move the clean-out member through the channel from one end of the trough to the other end thereof.

2. The combination called for in claim 1 wherein the clean-out member is a block conformed to the configuration formed by the channel and the cover.

3. The combination called for in claim 1 wherein the means to move the clean-out member through the channel are lines attached to each end thereof extendable through the channel, each line being of sufficient length to extend through the channel when the clean-out member is disposed in one of the retainers.

4. The combination called for in claim 1 wherein each retainer has a guide member extendable into the channel to maintain alignment thereof with the channel.

5. In a hydroponic plant bed, a trough; a hollow retainer portion at each end of said trough; an enclosed channel extending along the lower wall of the trough and communicating with said retainer portions; passages between the channel and the trough; a clean-out member movable through the channel; and means attached to the clean-out member and extendable through the channel to move the clean-out member through the channel and said means to move the clean-out member comprise lines attached to opposite ends thereof, each line being of sufficient length to extend through the channel and into said retainer portions, whereby the lines may be pulled to move the clean-out member through the entire length of the channel.

6. The combination called for in claim 5 wherein the clean-out member is a block shaped to substantially conform to the shape of the channel.

7. The combination called for in claim 5 wherein the passages between the channel and the trough are laterally extending grooves formed in the walls of the trough.

References Cited

UNITED STATES PATENTS

| | | | |
|---|---|---|---|
| 1,229,022 | 6/1917 | Bolger | 47—38 |
| 2,198,150 | 4/1940 | Barnhart | 47—1.2 |
| 2,295,004 | 9/1942 | Owen | 47—1.2 |
| 2,814,161 | 11/1957 | Hawkins | 47—38 |
| 3,292,198 | 12/1966 | Perkel | 15—104.16 |
| 3,365,840 | 1/1968 | Cooper | 47—34.12 |

ROBERT E. BAGWILL, Primary Examiner

U.S. Cl. X.R.

15—104.16; 47—1.2